March 25, 1924.                    1,488,343
H. A. HOFFMAN
METHOD OF MAKING TIRE CASINGS
Filed Aug. 13, 1921
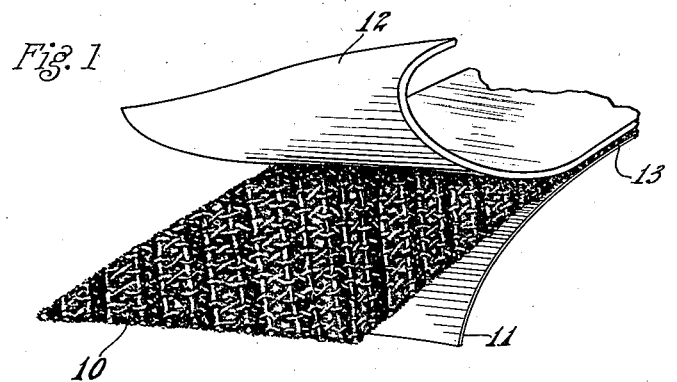
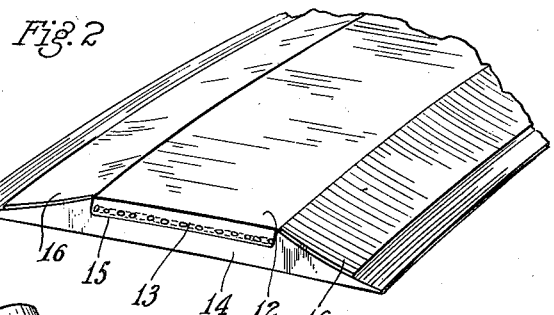
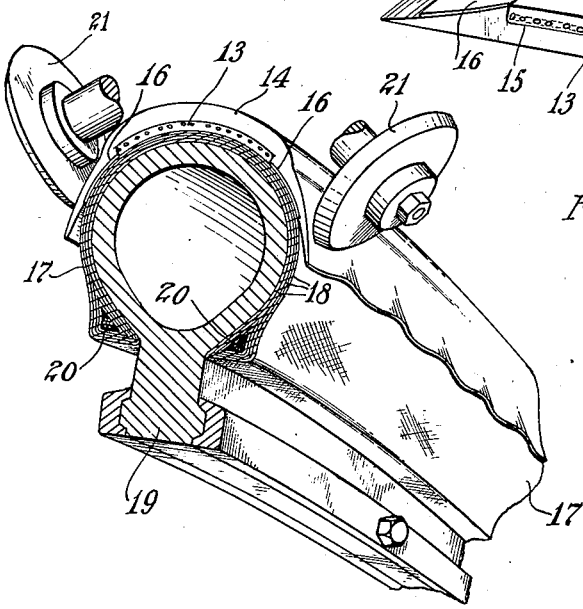
Inventor
H. A. Hoffman
By Robert M. Pierson
Atty.

Patented Mar. 25, 1924.

1,488,343

UNITED STATES PATENT OFFICE.

HARRY A. HOFFMAN, OF AKRON, OHIO, ASSIGNOR TO THE B. F. GOODRICH COMPANY, OF NEW YORK, N. Y., A CORPORATION OF NEW YORK.

METHOD OF MAKING TIRE CASINGS.

Application filed August 13, 1921. Serial No. 491,925.

*To all whom it may concern:*

Be it known that I, HARRY A. HOFFMAN, a citizen of the United States, residing at Akron, in the county of Summit and State of Ohio, have invented a certain new and useful Method of Making Tire Casings, of which the following is a specification.

This invention relates to the art of manufacturing pneumatic tires, and more especially casings which are vulcanized on a rigid core in a mold. Its principal object is to avoid the tendency of the plies of the carcass, or the breaker-strip, or both, to buckle, or to pinch between the halves of the mold, owing to the drag of the rubber on the fabric when the mold parts are brought together under heavy pressure.

Of the accompanying drawings:

Fig. 1 is a perspective view of one end of a breaker-strip used in building a tire according to the present invention.

Fig. 2 is a perspective view of one end of a tire-tread having the breaker-strip fastened thereto.

Fig. 3 is a perspective view of a section of a partially-built tire on a tire-forming core, illustrating the manner of shaping the rubber tread-strip and breaker-strip over the carcass.

In the drawings, 10 is a rubber frictioned, open-weave, bias-cut fabric breaker-strip, 11 a thin veneer of rubber on the under surface of the strip, and 12 a thicker veneer of rubber on the top surface of the frictioned fabric, the three layers sticking together and forming a composite breaker-strip 13. 14 is a rubber tread-strip, wedge-shaped or tapered outwardly along its edge-portions and having a rectangular channel 15 along the middle portion of its inner side, in which channel the composite breaker-strip is placed with the rubber veneer 12 projecting slightly above the upper surface thereof. 16, 16 are thin rubber filler-strips placed lengthwise of the tread-strip on either side of and contacting with the sides of the rubber veneer 12.

17 is a tire carcass formed of a plurality of layers 18 of either square-woven or cord fabric and unvulcanized rubber, shaped about a rigid core 19 and having bead-core rings 20 incorporated in its edge portions. The combined composite breaker-strip 13 and tread-strip 14 are usually shaped about the outer periphery of the carcass by spinning rollers 21, which are moved from the median line of the tread toward the thinner edge portions thereof while the tire is rotated.

In carrying out my invention, the rubber in the friction of the breaker-strip and in the two veneers 11, 12, is more or less cured (preferably only partially cured) before building said breaker strip into the tread or into the tire, either by cold vulcanization or by vulcanization with heat to set the friction on the fabric, firmly to unite the rubber veneers through the interstices of the fabric and to stiffen the breaker-strip and prevent a subsequent distortion of the latter under molding pressure. The rubber compositions used in the friction and veneers of the breaker-strip may be so chosen that after a semi-cure of the rubber sufficient to set the friction on the fabric threads the facing formed by the outer or exposed surfaces of the veneers will remain tacky, or, following the pre-cure, these surfaces may be coated with a facing of rubber cement to cause the breaker-strip to adhere firmly to the tread-strip and carcass.

The tire is then completed by adding the rubber side-walls and bead-covering strips and vulcanizing it on the core under compacting pressure in the usual or any suitable form of tire mold. During the latter step the pre-set breaker-strip serves as a shield to the carcass, preventing a distorting or pinching of the tread-portion of the carcass or of the breaker-strip when the mold sections are closed over it. The stiffened shield with its under veneer of rubber also tends to prevent a flattening of the threads of the carcass along its tread-portion during cure, thus adding to the life of the tire.

It has heretofore been proposed to semi-cure the rubber on the plies of the carcass fabric for a tire before building said plies into the tire, but that method is open to several objections including the fact that the semi-cured layers are so stiff that it is difficult or impossible properly to shape them to the form of the tire and secure good adhesion. My narrow semi-cured breaker-strip is not open to this objection and its use in the manner described makes it unnecessary to semi-cure the carcass plies before building the tire.

I may, of course, vary the procedure in any suitable manner, as by applying the semi-cured breaker-strip to the carcass and afterward applying the tread.

I claim:

1. The method of making pneumatic tires which comprises building the carcass of fabric plies coated with substantially unvulcanized rubber, applying a vulcanized, rubber surfaced, fabric breaker-strip and a substantially unvulcanized rubber tread to said carcass, and vulcanizing the tire under compacting pressure.

2. The method of making pneumatic tire casings which comprises building the carcass, on a rigid core, of fabric plies coated with vulcanizable raw rubber compound, applying a sheet-rubber coating to a fabric breaker-strip and semi-vulcanizing the rubber thereon, applying said semi-vulcanized strip to the tire and applying over it a tread of vulcanizable raw rubber compound, and vulcanizing the casing on said core in a mold.

3. The method of making pneumatic tire casings which comprises building the carcass on a rigid core out of fabric plies having an unvulcanized rubber coating, applying to an unvulcanized rubber tread a fabric breaker-strip coated with semi-vulcanized rubber and faced with tacky rubber, applying the tread and breaker-strip to the carcass, and vulcanizing the casing on said core in a mold.

In witness whereof I have hereunto set my hand this 10th day of August, 1921.

HARRY A. HOFFMAN.